United States Patent [19]

Johnson

[11] 4,315,675
[45] Feb. 16, 1982

[54] METHOD AND APPARATUS FOR SELECTIVELY POSITIONING SPECTRAL FILTER

[75] Inventor: Bruce K. Johnson, Andover, Mass.

[73] Assignee: Polaroid Corporation, Cambridge, Mass.

[21] Appl. No.: 156,198

[22] Filed: Jun. 3, 1980

Related U.S. Application Data

[63] Continuation-in-part of Ser. No. 108,546, Dec. 31, 1979, abandoned.

[51] Int. Cl.³ .............................................. G03B 7/14
[52] U.S. Cl. ..................................... 354/26; 354/27; 354/59; 356/225
[58] Field of Search ................................. 354/27–30, 354/26, 33, 34, 38, 42, 43, 49, 50, 59, 128, 139; 350/1.1, 1.2, 1.3, 1.4, 195, 196; 250/482; 356/215, 224, 225

[56] References Cited

U.S. PATENT DOCUMENTS

| | | | |
|---|---|---|---|
| 3,173,347 | 3/1965 | Stimson | 95/10 |
| 3,468,228 | 9/1969 | Rogers | 95/12.2 |
| 3,500,730 | 3/1970 | Matsubara et al. | 95/10 |
| 3,672,281 | 6/1972 | Land | 95/42 |
| 3,896,458 | 7/1975 | Johnson et al. | 354/30 |
| 3,903,413 | 9/1975 | Manning | 250/226 |
| 3,942,183 | 3/1976 | Whiteside | 354/29 |
| 4,040,070 | 8/1977 | Hochreiter | 354/59 |
| 4,104,653 | 8/1978 | Johnson et al. | 354/27 |

FOREIGN PATENT DOCUMENTS 1001537  8/1965  United Kingdom ............... 350/196

OTHER PUBLICATIONS

Patent application Ser. No. 110,811 filed Jan. 10, 1980, Apparatus for Varying the Spectral Filter Over the Photocell as a Function of Blade Position, Milton Dietz.
Patent application Ser. No. 108,219 filed Dec. 31, 1979, Method and Apparatus for Selective Positioning of Spectral Filter During Exposure Control, Bruce K. Johnson.
Patent application Ser. No. 74,993 filed Sep. 13, 1929.
Novelty and Infringement on Arrangement for Varying IR Filter Over the Photocell, Law Office of Sandler & Greenblum, Dec. 17, 1979.
Infringement Study XL Shutter Design, Bacon & Thomas, Sep. 8, 1977.
Novelty and Infringement Search on Arrangement for Selective Presentation of IR Filter during Exposure Control, Sandler & Greenblum, May 30, 1980.
Infringement Search on Exposure Control System Employing Split Spectral Filters, Sandler & Greenblum, May 30, 1980.

*Primary Examiner*—Joseph W. Hartary
*Assistant Examiner*—S. D. Schreyer
*Attorney, Agent, or Firm*—Leslie J. Payne

[57] ABSTRACT

Method and apparatus using shutter blade and photocell lens arrangement for automatically controlling exposure of a photographic film by evaluating selected spectral scene light frequencies during certain ambient light portions of an exposure interval and evaluating additional spectral frequencies during a flash portion of the interval.

21 Claims, 13 Drawing Figures

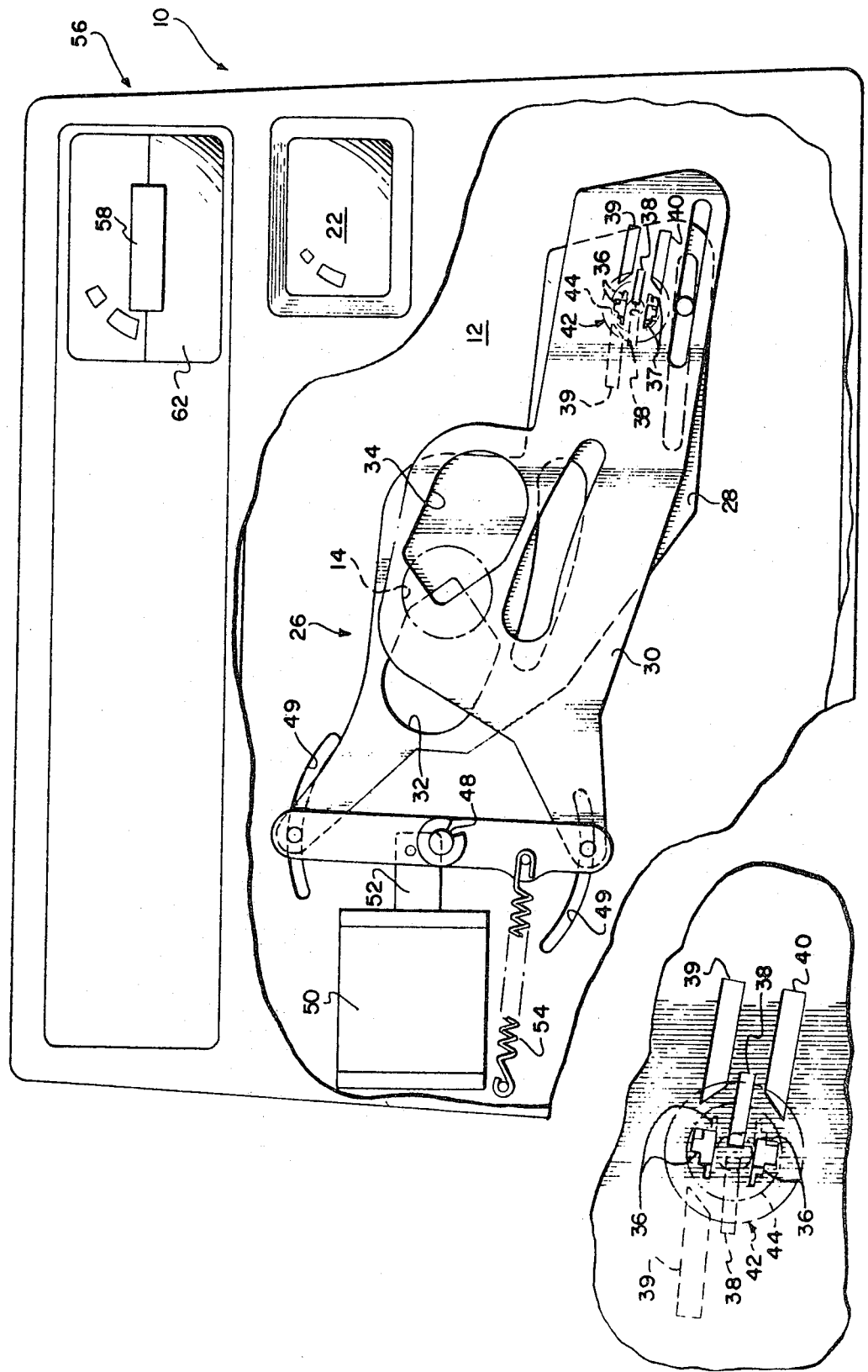

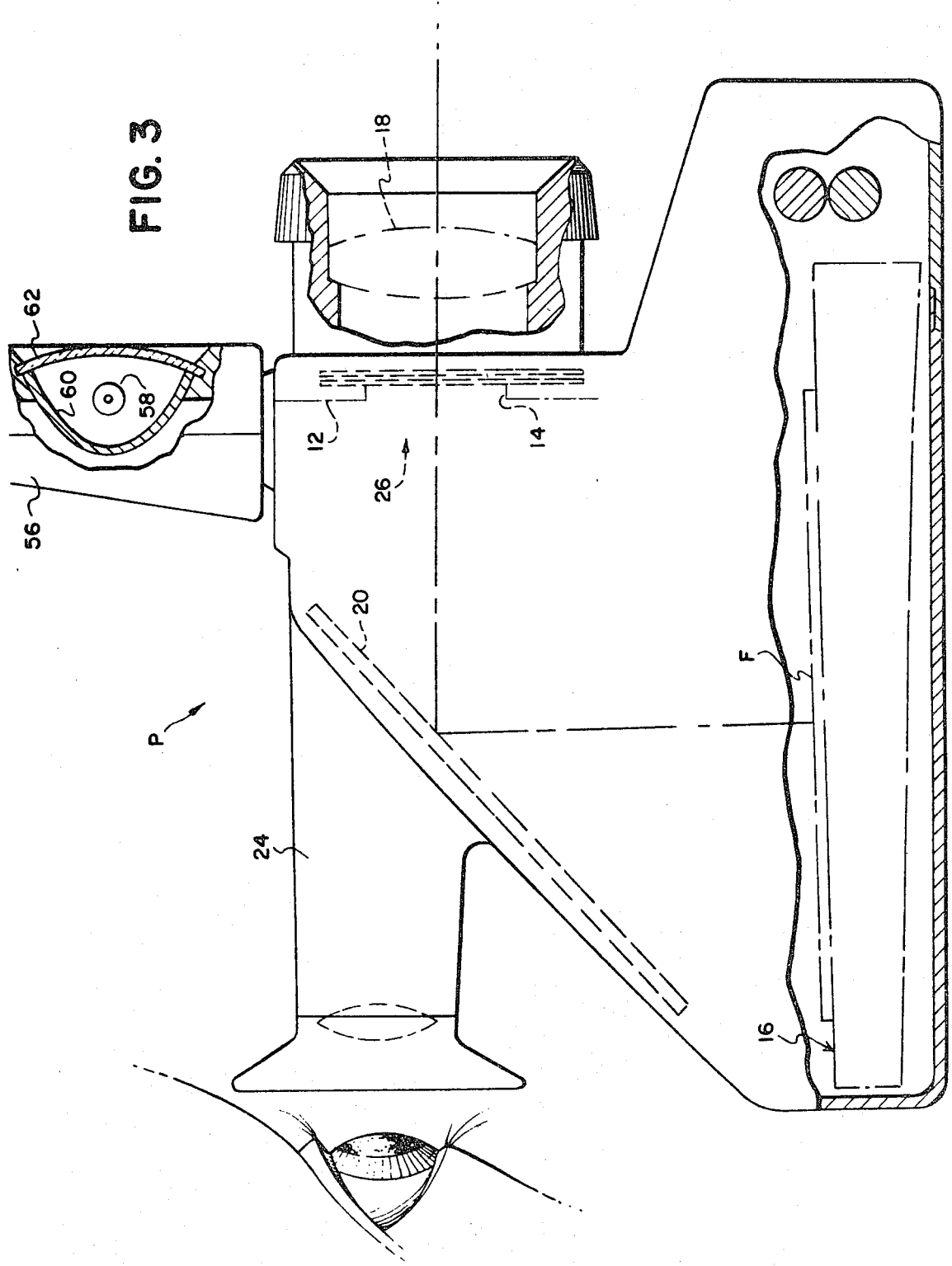

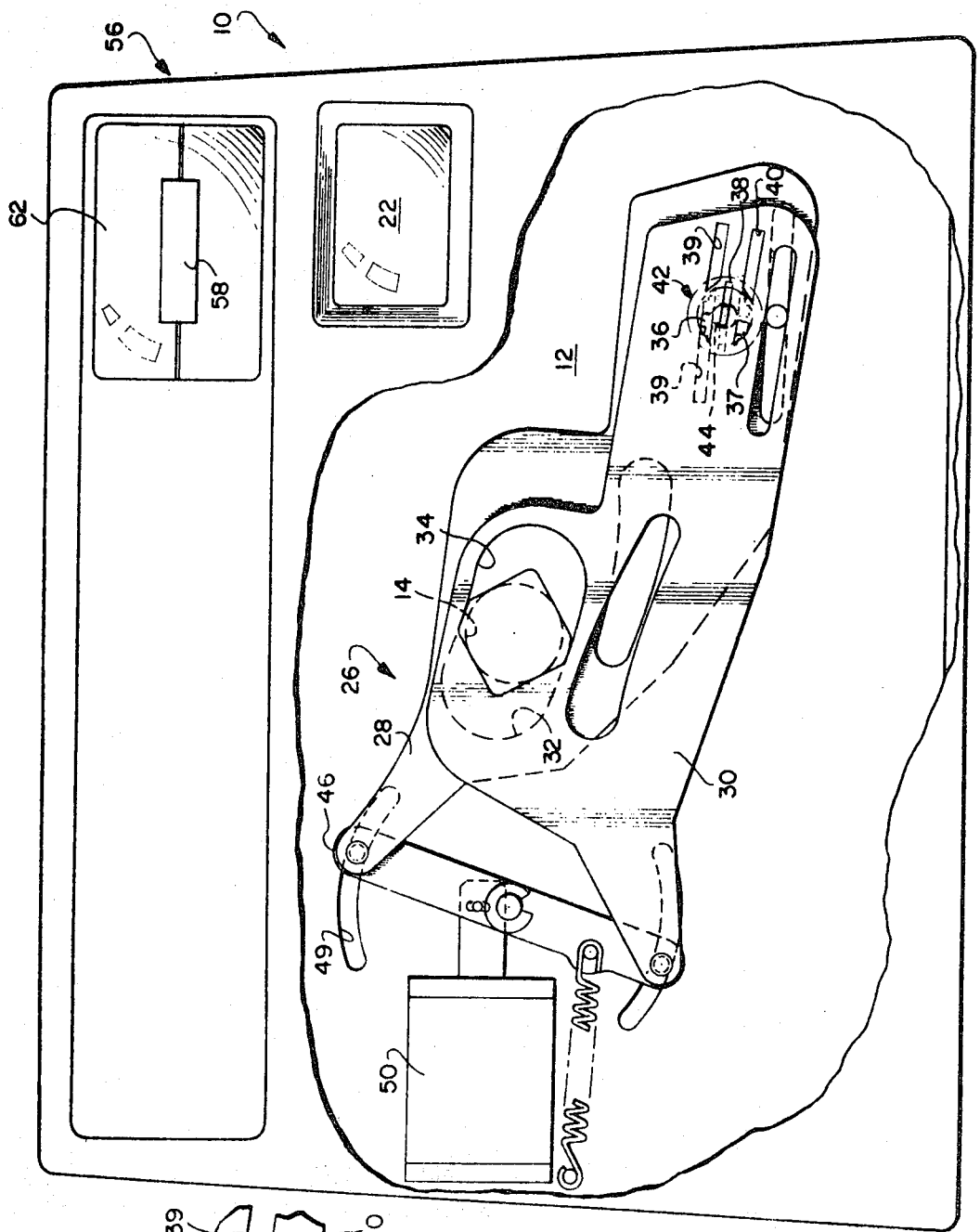
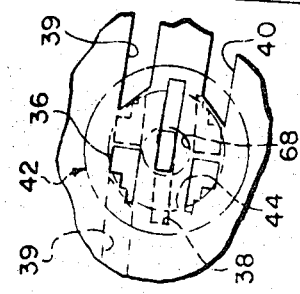
FIG. 4A
FIG. 4

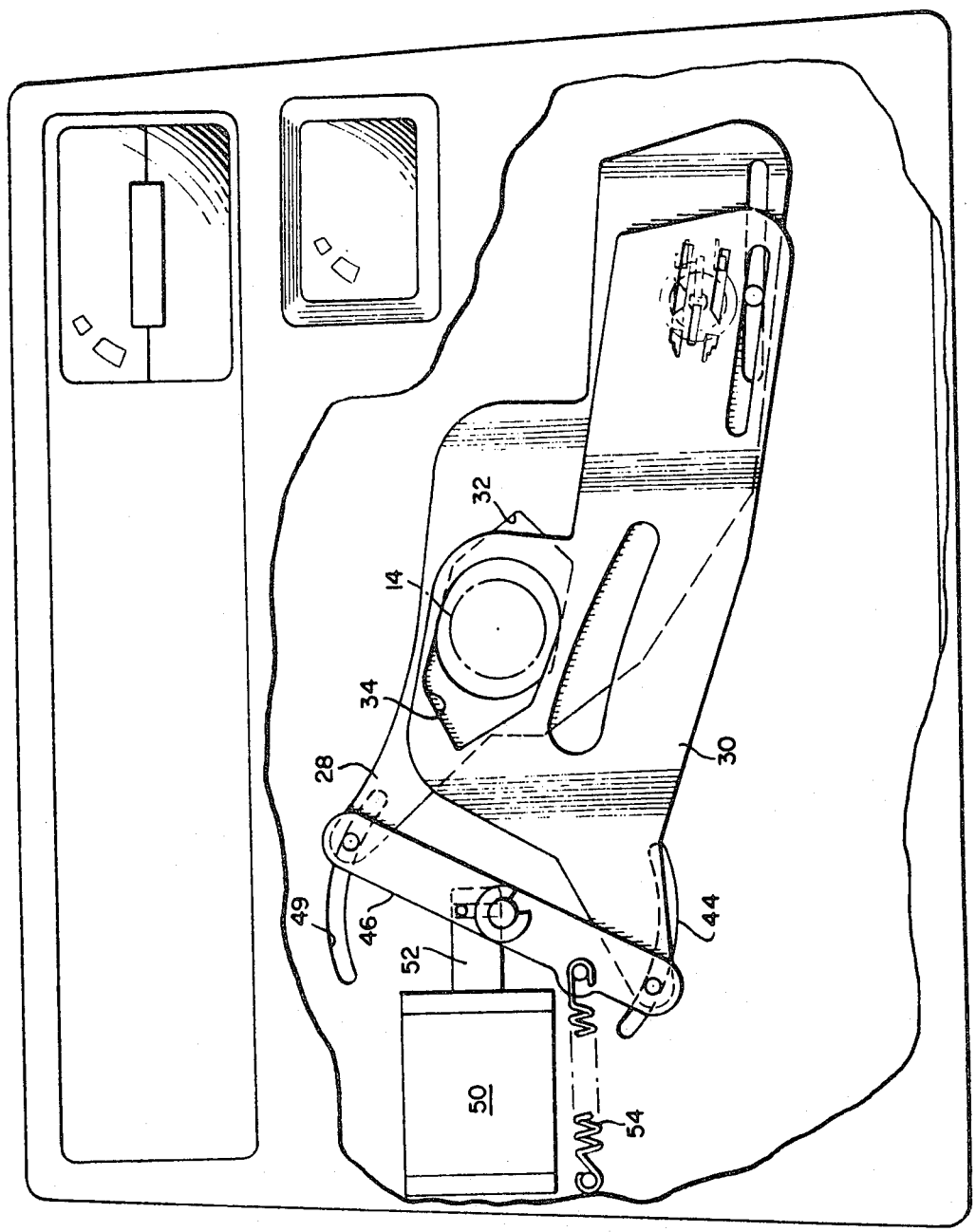
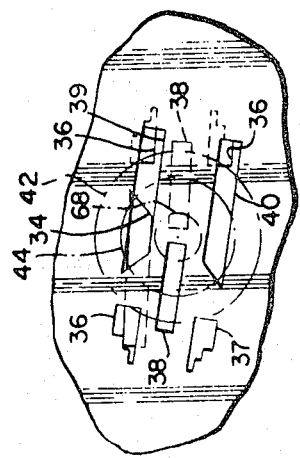
FIG. 5
FIG. 5A

METHOD AND APPARATUS FOR SELECTIVELY POSITIONING SPECTRAL FILTER

CROSS REFERENCE TO RELATED APPLICATION

This application is a continuation-in-part of U.S. patent application Ser. No. 108,546, filed on Dec. 31, 1979, by Bruce K. Johnson, now abandoned.

BACKGROUND OF THE INVENTION

This invention relates generally to the photographic field and, more particularly, an improved method and exposure control system for automatically and selectively controlling the filtering of light incident upon a photoresponsive element during exposure.

Automatic light responsive control systems are well known in the photographic arts. Essentially, these systems evaluate scene brightness levels of illumination for controlling exposure parameters, including effective aperture size and exposure interval, as a function of scene brightness evaluated against the sensitometric characteristics of the film being used. Typically, scene brightness evaluation is performed with light-measuring circuits including one or more photoresponsive elements.

One such automatic exposure control system employs scanning type shutter blades. Exemplary scanning shutter blades usable in exposure control systems are generally disclosed in U.S. Pat. No. 3,942,183, issued Mar. 2, 1976, to George Whiteside; and U.S. Pat. No. 4,104,653, issued Aug. 1, 1978, to Bruce K. Johnson et al., all of which are presently assigned with the present application. As described in these patents, there are cooperating pairs of primary and secondary apertures formed in the shutter blades. These pairs of apertures cooperate respectively for blocking and unblocking the passage of light through an exposure opening to a film plane and through a photocell opening to a light sensing or photoresponsive cell used for controlling blade positioning. During the exposure cycle, the secondary apertures operate in conjunction with the photocell and a control circuit to define both the aperture values achieved and the exposure interval as a function of the amount of light received through the secondary apertures. In such systems, photoresponsive elements of the silicon type are commonly used because they, among other things, have excellent long term stability and linearity of output signal with input light power changes.

For optimizing the quality of the resultant photographs when using automatic exposure control systems, such as the type noted, it is known to employ spectral correction filters to correlate the spectral sensitivity curve of the photoresponsive element more closely with that of the photographic color film. Without such a filter, the photocell would react to the light frequencies, such as infrared (IR), and cause the control circuit to terminate exposure earlier than desired. This is especially the case when the photocell is of the silicon type, because such a photocell tends to be red (IR) sensitive. For providing the desired correction, a spectral correction filter is interposed in the photocell's optical path, for example, as described in U.S. Pat. No. 3,903,413, issued on Sept. 2, 1975, to Monis Manning; and commonly assigned with the present application. This patent discloses use of a silicon photodiode, sensitive to radiant energy between about 350 nm and 1200 nm, whereas the sensitivity of typical color photographic film is confined to the visible region of the spectrum, i.e., from about 400 nm to about 700 nm. Use is made of a spectral correction filter with peak absorption in the near-infrared region (700–1200 nm) and high transmission in the visual region to correct or generally match the spectral response of the photocell in relation to the film. This matching of sensitivities is particularly useful in cameras employing diffusion transfer photographic processes of the so-called "instant photography" type where errors in the exposure cannot be later compensated for as is possible with film subsequently developed in a photographic laboratory.

While use of infrared filters serve satisfactorily, complications can arise when reflectivities of different objects in photographic scenes exhibit widely disparate values, for example, where the exposure of the subject's facial skin is adversely affected because of the widely disparate reflectivities of the surrounding clothing or other objects, particularly in close-up situations. Partly as a result of this, it has been found advantageous to remove the infrared filter in flash exposure modes of operation.

Consequently, although retention of spectral correction filter in the photocell's optical path has been practiced during both ambient and artificial illumination modes, as disclosed in U.S. Pat. No. 4,040,070, issued on Aug. 2, 1977, to W. Hochreiter et al., a spectral correction filter (possibly an IR) is removed from the photocell's optical path when the flash mode is desired. This removal is achieved, upon attaching a flash unit to the camera, by actuation of a relatively complicated mechanical arrangement which swings the filter out of the optical path.

Still other known prior art is described in U.S. Pat. No. 3,468,228, issued on Sept. 23, 1969, to Howard G. Rogers, which provides automatic sequential positioning of a pair of dual filters over photocell and exposure apertures to attain a color balanced exposure of photosensitive material.

Approaches have been developed which represent substantial improvements over those known in the prior art. In this regard, copending applications entitled "Apparatus For Varying the Spectral Filter Over the Photocell as a Function of Blade Position", of Milton Dietz, and "Method and Apparatus For Selective Positioning of Spectral Filter During Exposure Control", of Bruce K. Johnson, Ser. Nos. 110,811 filed Jan. 10, 1980; and 108,219 filed Dec. 31, 1979; respectively; and commonly assigned herewith disclose exposure control systems for automatically controlling scene light intensity and spectral filtering thereof during an exposure interval as a function of blade mechanism positioning which itself is a function of the scene light intensity. More specifically, the system in Ser. No. 110,811 effectively removes a blocking infrared filter relative to the photocell detector during a portion of the exposure interval. Both of the above systems operate extremely satisfactorily.

SUMMARY OF THE INVENTION

In accordance with the present invention, an improved method and apparatus employing photocell lens and shutter blade arrangement for automatically controlling exposure of a photographic film in accordance with selected spectral scene light frequencies during a predominantly ambient portion of an exposure and additional or other spectral frequencies of scene light during a flash portion of the exposure.

In the illustrated embodiment, there are provided means for mounting photographic film material at a given focal plane and a light exposure opening for allowing passage of light to the film and to detecting means for evaluating scene light; a flash means for illuminating the scene; and a blade mechanism mounted for displacement between first and second positions for defining an exposure interval and both changing primary aperture values over the exposure opening and changing secondary aperture values over the detecting means as the mechanism moves toward its second position. Selectively actuatable drive means are provided for initially displacing the blade mechanism from the first position toward the second position, and in response to the amount of scene light detected by the detecting means for firing the flash means and for also returning the blade mechanism to the first position.

In one embodiment, the filtering means is a spectral filter positioned relative to the blade mechanism and a photocell of the detecting means serves to substantially block transmission of preselected scene light frequencies to a preselected area of the detecting means and to further define an unfiltered area substantially allowing transmission of a broad range of scene light to the detecting means. During blade mechanism movement from the first or scene light blocking condition toward a second scene light admitting position, secondary apertures sweep past the spectral filter in such a fashion as to initially block passage of scene light thorugh the unfiltered portion while permitting passage of and filtering of such scene light by the spectral filter. As the blades continue to sweep toward the second position, the secondary apertures then become positioned to substantially block transmission of scene light through the filtered portion while simultaneously allowing scene light passage through the unfiltered area. Advantageously, since the blade scan is terminated early under moderate-to-high scene light levels, spectral filtering, such as IR, is provided for the predominantly ambient exposure while under lower light levels, where the flash provides a significant contribution, the IR frequencies are evaluated by the system.

Among the objects of the invention are, therefore, a method of providing an improved photographic exposure control process; a method of providing improved flash photography; and the provision of photographic apparatus having an improved exposure control system including a spectral filter and blade mechanism which cooperate to effect selective filtering of the scene light admitted to the photoresponsive element as a function of the scene light.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 2 is an elevational view diagrammatically depicting the blade mechanism of FIG. 1 in an initially open condition during operation;

FIG. 2A is an enlarged fragmentary view illustrating in greater detail the cooperative relationship of the secondary sweep apertures with respect to the spectral filter when in the position shown in FIG. 2;

FIG. 3 is a side elevational view diagrammatically showing the improved exposure control system of this invention;

FIG. 4 is a view similar to FIG. 2 but showing the blade mechanism of FIG. 1 in a more open arrangement;

FIG. 4A is an enlarged fragmentary view showing the secondary sweep apertures in a position relative to the spectral filter when in the position shown in FIG. 4;

FIG. 5 is a view similar to FIG. 4 but showing the blade mechanism in its fully open arrangement;

FIG. 5A is an enlarged fragmentary view showing the secondary sweep apertures in a position relative to the spectral filter when in the position shown in FIG. 5;

DETAILED DESCRIPTION

Figure 1:
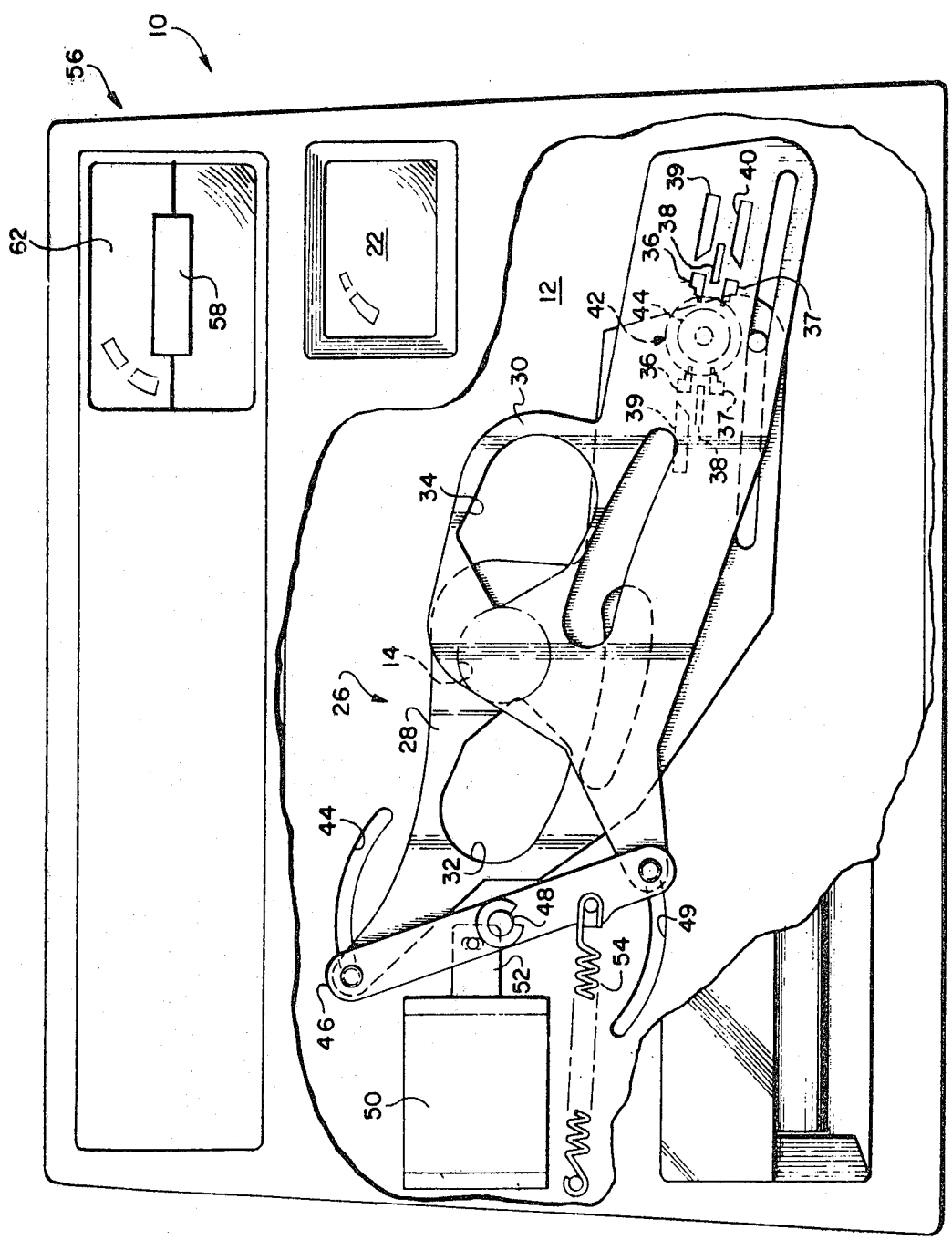
FIG. 1 is a diagrammatic front view in elevation depicting a photographic camera incorporating the improved exposure control system of this invention including a blade mechanism illustrated in a closed condition.

Referring now to FIG. 1, it can be seen that the improved exposure control system of this invention is contained within a housing of photographic camera 10. Included within the camera housing 10 is a rear block casting 12 constructed to support components of the exposure control system. A light exposure aperture 14 is centrally formed in the casting 12 and defines the maximum available exposure aperture of this control system as well as allows passage of scene light to a photographic film unit (not shown) of a film pack 16. Examples of such a film pack 16 are described in U.S. Pat. Nos. 3,543,662; 3,705,542; 3,748,984 and 3,779,770. Each of the film units of the pack 16 is successively positioned at the focal plane F of the camera. It is noted that the camera is of the self-developing type usable with a film pack of the type manufactured and sold by the Polaroid Corporation as the Polaroid SX-70 Land film pack.

Mounted on a front wall of the housing 12 is a taking or objective lens 18 of the fixed focus type. The taking lens 18 focuses the image carrying rays from the scene to be photographed along an exposure path to a mirror 20. Although the described lens 18 is illustrated as a fixed focus type, an adjustable lens assembly is also contemplated as a substitute therefor. From the mirror 20, the rays are reflected to the uppermost film unit of the film pack 16. Additionally, a viewing window 22 is located in the front face of the camera housing 10 and operates in conjunction with a viewing system 24 for permitting viewing and framing of the scene to be photographed by the operator. Control of the exposure path is provided by the improved exposure control system 26.

Although the above exposure control system is described for use with photographic cameras of the non-reflex type, the intended scope of this invention is by no means so limited. Accordingly, cameras of the well-known reflex type, such as described in U.S. Pat. No. 3,672,281, entitled "Reflex Camera", by E. H. Land, commonly assigned herewith, may be equally suitable for embodying the exposure control system of this invention.

Figure 6:
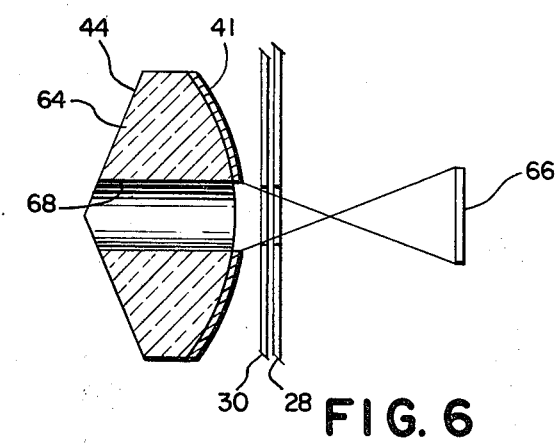
FIG. 6 is a diagrammatic view depicting the relationship of the blade mechanism and spectral filter of the improved exposure control system.

Reference is now made to FIGS. 1–5 for better showing the constructional and positional arrangement of the exposure control system 26. Included in this system 26 is a blade mechanism having overlapping shutter blade elements 28 and 30. With particular reference to FIGS. 1 and 6, the shutter blades 28 and 30 are supported in the block casting 12 intermediate the objective lens 18 and the light entering exposure opening 14. A pair of scene light admitting primary apertures 32 and 34 are provided, respectively, in the blade elements 28 and 30. In use, the primary apertures 32 and 34 coincide and overlap progressively over the light entering exposure opening 14 to define progressively increasing primary aperture values as a function of blade positioning during an exposure interval.

The shutter blades 28 and 30 additionally include a pair of secondary apertures, each consisting in the illustrated embodiment of a plurality of apertures such that the blades have a plurality of sets of sweep secondary apertures generally indicated by reference numerals 36, 37, 38, 39, 40. In operation, the sets of secondary apertures 36, 37, 38, 39, 40 move in correspondence with the primary apertures 32, 34 to progressively coincide so as to define progressively varying and distinct sets of secondary aperture values as a function of blade positioning during exposure. As will be explained in greater detail, the sets of secondary sweep apertures 36-40 cooperatively coincide with each other and with a spectral filter 41 (FIG. 6) to effectively and automatically control the intensity and spectral frequency of scene light passing to a light detecting station 42 as a function of blade positioning during the exposure interval. This light detecting station 42 includes a photoresponsive device or photocell 44 aligned with a photocell light entry window (not shown) in the housing 10. Preferably, the photocell 44 is of the silicon photodiode type. Also, included in the light detecting station 42 is a control circuit (not shown) for collectively operating with the photocell 44 for terminating the exposure interval as a function of time integration of the intensity of light incident upon the photocell 44 as permitted by the overlapping sets of photocell sweep apertures 36-40.

An exposure control system embodying the abovedescribed light detecting station 42 is described in the commonly assigned copending U.S. patent application Ser. No. 74,993, filed on Sept. 13, 1979. Since the light detecting station 42 does not per se form an aspect of the invention, only those details needed for an understanding of the present invention will be given. Also, for greater details of the construction and operation of the blade mechanism, reference is made to commonly assigned U.S. Pat. No. 3,942,183. Since the blade mechanism does not by itself form an aspect of the invention, only a description of its construction necessary for a complete understanding of this invention will be set forth. In this regard, it will be understood that distal ends of the shutter blades 28, 30 are pivotally connected to distal ends of a walking beam 46. The walking beam 46 is pivotally connected to the block casting 12 by a pivot pin 48 and its distal ends have pin members extending through respective circular openings in the respective blade elements which pins slidably engage respective arcuate slots 49 formed in the rear casting 12 for prohibiting shutter blade disengagement during exposure control operations.

Displacement of the shutter blades 28, 30 relative to each other and to the light detecting station 42 and to the spectral filter 41 is provided, in part, by a tractive electromagnetic device or solenoid 50. Such solenoid 50 includes an internally arranged and movable cylindrical plunger unit 52 which retracts upon solenoid energization. This plunger unit 52 is affixed to the walking beam 46 by means of a pivot pin or stud. Thus, longitudinal displacement of the plunger unit 52 is effective to rotate the walking beam 46 about the pivot pin 48 and in so doing cause appropriate displacement of the shutter blades 28, 30; as will be described more fully.

For continuously urging the primary apertures 32, 34 and the sets of secondary sweep apertures 36-40 to positions defining their effective apertures, there is provided a biasing spring 54. One end of the spring 54 is affixed to the block casting 12 while its opposite end is attached to the walking beam 46. As should be understood readily, the exposure control system 26 is also applicable to photographic systems wherein the blades 28, 30 are spring biased to a normally closed position.

For purposes of battery power conservation, it is undesirable to have the solenoid 50 continuously energized to maintain the shutter blades 28, 30 in the scene light blocking conditions (FIG. 1) when the camera is not in use. Towards this end, there is provided a latch mechanism (not shown) operable automatically at the end of each exposure for latching the walking beam 46 in the scene light blocking position. Thus, the solenoid 50 is deenergized when the blades 28, 30 are in the scene light blocking condition. Unlatching of the latch mechanism commences upon exposure. Details of this latching mechanism including its operation do not per se form an aspect of this invention; therefore, reference is made to U.S. Pat. No. 4,040,072, issued Aug. 2, 1977, and assigned in common herewith for a more complete description thereof.

Reference is now made to the flash strobe unit 56 of the present embodiment. In essence, the electronic flash strobe unit 56 is cooperatively associated with the photographic camera apparatus to contribute a predetermined proportion, i.e., fill flash of the scene light admitted by the shutter blade mechanism to expose the film in a manner to be subsequently described. Since this type of fill flash does not per se form an aspect of the present invention, only those details necessary for an understanding of the present invention will be described. However, a more detailed description of the electronic flash apparatus is given in the aforementioned copending application Ser. No. 74,993 now U.S. Pat. No. 4,255,030. The electronic flash strobe unit 56 is affixed to an upper surface of the camera housing 10. Included in the unit 56 is a flash discharge tube 58 located in a suitable reflector 60 behind a lens 62. A quench tube (not shown) is provided for interrupting the flash discharge of the flash discharge tube 58 and electric power for the electronic flash strobe unit 56 is provided by a battery (not shown) carried in the film pack 16.

As described in the above-mentioned application, the output signal from a light integrator circuit (not shown) of the scene light detecting station 42 is directed to three level detector circuits (not shown) which all may be of a well-known design, such as a Schmitt trigger. The output from one of these level detectors controls a flash fire trigger circuit (not shown) of the electronic flash unit 56. The second level detector is effective to control the energization of the solenoid 50, and the third level detector is effective to control a flash quench circuit (not shown).

For purposes of illustrating operation of the flash unit 56, the level detector which controls energization of the solenoid (to close the shutter) is configured to trigger at 1.0 volt, which is a normalized value representative of a select or optimum film exposure value for a predetermined film speed; the level detector for controlling the quench trigger circuit is set to trigger at 1.2 volts; and the level detector for controlling the flash fire trigger circuit is set to trigger at 0.75 volts. Because for these relationships are more adequately described in the noted copending application. These values will, however, later serve to better describe the present invention. Also, a flash time delay circuit (not shown), which receives an input signal upon the deenergization of the solenoid 50, is included to provide a time delayed flash fire signal operative to trigger the flash under very low ambient light conditions as later explained in detail. The time delay provided by the flash delay circuit may be in the order of 65±4 msec. Finally, a shutter time out circuit (not shown) is also provided as described in the noted copending application.

Operation of a camera actuator button (not shown) powers up the camera 10, enables the strobe unit 56 for subsequent firing and releases the shutter latch mechanism to allow shutter blade movement to commence the exposure cycle. More specifically, the shutter blades 28 and 30 move in opposite directions from the scene light blocking condition of FIG. 1 toward the maximum primary aperture value shown in FIG. 4. Thus, the effective aperture area over the light entering exposure opening 14 is enlarged progressively.

Simultaneously with enlarging primary aperture values, the secondary photocell sweep apertures define a corresponding progressively enlarging secondary effective aperture opening over the light detecting station 42. In this embodiment, the effective photocell sweep aperture value defined by the overlapping secondary apertures tracks ahead of or leads the effective scene light admitting primary aperture defined by the overlapping primary apertures 32 and 34 to anticipate in a well-known manner for the additional scene light admitted to the film plane during the finite time required to drive the shutter blades 28, 30 from the scene light unblocking arrangement of FIGS. 2 and 4 back to the scene light blocking arrangement of FIG. 1, as is more fully described in U.S. Pat. No. 3,896,458, entitled "Automatic Exposure Control System", issued July 22, 1975, in common assignment herewith and now incorporated by reference herein.

The photocell 44 provides a time varying response representative of the time integration of the scene light intensity incident to the photocell. Under conditions of moderate-to-high scene light, when the integration signal reaches 0.75 volts, the flash level detector triggers firing of the flash discharge tube 58 in a well-known manner. Assuming the photographic subject is within the effective range of the flash, there will be an immediate and substantial increase in the reflected scene light to which the detecting station 42 will respond to provide the required voltages to trigger the second and third level detectors for respectively effecting re-energization of the solenoid 50 and quenching the flash tube. Thus, the shutter blades 28, 30 move back to the scene light blocking arrangement as shown in FIG. 1, and the exposure interval is terminated.

In regard to the exposure control, it should be noted that with diminished intensity of scene light, the flash unit is fired at later times such that the flash is fired at larger primary and secondary aperture values. Moreover, under conditions of extremely low or negligible ambient scene light intensity, the light integrator circuit will not provide a 0.75 volt output response prior to the expiration of the 65±4 millisecond flash time delay. For these conditions, a signal is transmitted by the flash delay circuit at the expiration of the noted time delay to effect flash firing. Moreover, in the event that there is neither sufficient available ambient scene light and/or artificial flash light for the output signal from the light integrator to reach 1 volt, the shutter time out circuit operates to energize the solenoid 50 and thereby limit the maximum exposure interval to, for example, 100 milliseconds. In this manner, the camera apparatus of this invention is provided with an electronic flash together with means for controlling the energization of the electronic flash to assure that a predetermined proportion of a select film exposure value will be attributable to the artificial light provided by the electronic flash at least when a subject is within the effective camera-to-subject distance range of the flash.

Reference is again made to FIGS. 1–6 for better describing the structural and functional interrelationship between the shutter blades 28, 30, spectral filter 41 and the photocell 44.

With particular reference to FIG. 6, the photocell 44 is seen to include a photocell lens 64 and linearly spaced therefrom a silicon photocell detector 66 which produces a current output when subjected to incident radiation. In the illustrated embodiment, the photocell lens 64 is of the defocusing type. The photocell lens 64 is in optical alignment with the photocell light entry window (not shown) in the front face of the camera housing 10 and receives the scene light passing through the sets of secondary apertures. Positioned intermediate the photocell lens 64 and the silicon photocell detector 66 is the pair of scanning shutter blades 28, 30. Positioning of the shutter blades 28, 30 relative to the photocell lens 64 is carried out to insure that the secondary sweep apertures 36–40 direct preselected portions of spectrally filtered scene radiation passing through the filter 41 to the photodetector 66 for purposes subsequently explained.

For purposes of carrying out the selective attenuation of spectral energy, this embodiment has the rear face of the photocell lens 64 partly covered with a coating effective for blocking infrared radiation (IR). This coating is in the form of an annulus, such as best shown in FIG. 6. Since the center portion 68 of the photocell lens 64 is unfiltered, it will allow IR radiation to the photocell detector 66 as well as the visible spectral energy. The significance of this relationship in modifying exposure control will be explained subsequently. It should be noted that the center portion 68 may also be provided with another lens (not shown) for further assisting in directing scene light to the photocell detector 66.

Referring back to the blocking IR filter 41, it is fabricated to attenuate spectral energy within the broad wavelength range to which the photocell detector 66 is sensitive (e.g., 360–1200 mm) and, preferably, to remove substantially all the spectral energy in the IR region (e.g., 700–1200 nm) of the photocell range. Thus, visible spectral energy remains after passing the IR filter 41. Control of the photometric response by selective filtering and nonfiltering of the radiation incident upon the photodetector 66 is accomplished by the unique cooperation between the photocell lens 64, spectral filter 41 and the sets of secondary sweep apertures 36–40.

Prior to describing the filtering operation in detail, it should be first explained that the novel arrangement automatically provides IR filtering of the photocell input at moderate-at-high light levels since the ambient contribution is most important under such conditions, but under lower light levels permits passage of, and evaluation of, the IR because the flash illumination is then of greater importance to the resulting photograph. Broadly, the secondary apertures in conjunction with the filter 41 provides means for substantially permitting transmission of selected frequencies during one portion of the blade scan and, hence, the exposure interval while precluding transmission of the same frequencies during another portion; at least when the scan reaches large aperture values under low light conditions. As shown in FIG. 2, the pairs of photocell sweep apertures 36, 37, during initial shutter blade sweep from the light blocking condition of FIG. 1 to the condition shown in FIG. 2, progressively cooperate to pass only scene light passing through the annular filter 41. The filter 41 acts, of course, to block the IR while the opaque portion of the shutter blades 28, 30 block passage of unfiltered light through the center portion 68. It is envisioned that this relationship of the shutter blades 28, 30 will be at positions corresponding to moderate-to-high ambient light conditions and correspond to primary aperture values less than their maximum. With the scene light being filtered by the IR filter 41, the potential of overexposing blue sky is eliminated. As noted in the copending application, a flash will be fired during this exposure and the reflected light thereof evaluated in accordance with the invention without the benefit of IR radiation; however, since the flash contribution under these levels of ambient light is not controlling, the lack of precise flash accuracy is tolerated in favor of ambient control.

Under conditions wherein ambient light is very low, the photocell detector 66 in cooperation with the light integrating circuit reenergize the solenoid 50 at a later time to terminate exposure. Therefore, under low ambient light conditions, the shutter blades 28, 30 sweep beyond their position in FIG. 2 and ultimately to the position shown in FIG. 5, and in doing so the central secondary sweep apertures 38 progressively coincide over the unfiltered portion 68 to define sweep aperture values which allows transmission of infrared spectral energy to the photocell detector 66 as well as the visible spectral energy while the aperture values defined by the secondary sweep apertures 36, 37 eventually terminate. As a result, in moving from the blade position of FIG. 2 to that of FIG. 5, the spectral filtering is rapidly diminished, and in fact, eliminated by means of masking elements as explained below. Under the latter condition, the primary apertures 32, 34 define their maximum effective diameter.

Figure 7:
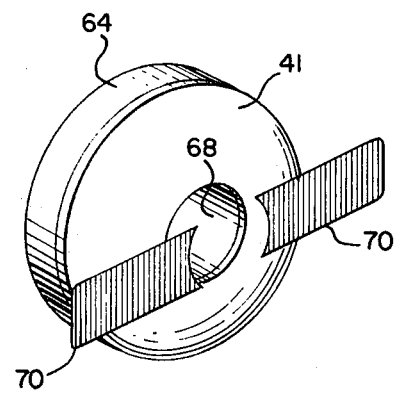
FIG. 7 is a diagrammatic perspective view showing the relationship of the masking members to the spectral filter.

Since the secondary sweep aperture value defined by the central sweep apertures 38 will, when in coincidence, overlie a portion of the annulus 41 and thereby allow light to pass through the filter 41, the masking elements 70 (FIGS. 6 and 7) are provided. These masking elements 70 may be connected to the camera housing 10, the lens 64, or any camera portion so as to fixedly be in position to the light path to the photocell. In this regard, the pair of masking elements 70 essentially straddle the unfiltered central portion 68 and have their terminal ends with arcuate formations to match the curvature of such central portion. Thus, the masking elements 70 block filtered scene light passed through the filter 41 and the central sweep apertures 38 from reaching the photocell detector 66. The exposure control system 26 can also operate without the masking elements 70 since the effect of such slight blocking of the IR leakage on film exposure during transition can be minimized for practical purposes. Further, the filter 41 can also be constructed as a pair of annular segments mounted at the top and bottom of the lens 64 as viewed in FIG. 7.

Since, under high ambient light conditions, the blade scan is terminated early, only the sweep apertures 36 and 37 provide aperture values over the photocell. Hence, the absorption filter 41 blocks, or precludes transmission of, IR radiation from the scene at such time. However, with lower ambient light levels, the secondary apertures 38 come into coincidence over the unfiltered opening 68 (while apertures 36 and 37 pass out of coincidence) as larger exposure values are formed. Accordingly, the shutter blades 28, 30 move to the position shown in FIG. 4 where the filterless opening 68 is employed for transmission to the photocell. Consequently, in the latter case, the scene light incident upon the photocell 44 is selectively filtered to block IR during the initial portion of the displacement of the shutter blades 28, 30 or that is, an initial portion of the exposure interval and then becomes unfiltered as opening 38 coincide so that the photocell then responds to both IR and visible radiation during this subsequent portion of the displacement.

Hence, it should be understood that the filter 41 in conjunction with the blade mechanism provides means for automatically permitting transmission of selected frequencies of light to the sensing or detecting means during at least one portion of the displacement of the blade mechanism or, that is, one portion of the exposure interval while substantially precluding transmission of the selected frequencies to the sensing means during another portion thereof.

Consequently, in accordance with this invention when the flash unit 56 is fired in situations of somewhat low ambient scene light (where the flash contribution to the resulting photograph is predominant as compared to the ambient contribution), the shutter blades 28, 30 will, during scanning, be positioned during the strobe flash with apertures 38 in coincidence so that the IR filter 41 is not in spectral filtering relationship to the photocell 44. Thus, the photocell 44 is no longer blocked from receiving IR radiation. As a result, during the early stages of blade displacement, prior to the flash, only visible light will be incident upon the photocell while at the later stages, during flash operation both visible and IR radiation are evaluated such that the earlier mentioned difficulties encountered with flash firings will be substantially overcome. In this regard, objects viewed in the visible spectral region exhibit widely different light reflectivities while the near infrared region (e.g., 750–1200 nm) is characterized by more uniform reflectivity for most common materials. Therefore, the IR reflectivity is much less dependent on the visible color (specific visible light absorption), and objects viewed by infrared are relatively independent of the reflectivity disparities earlier described. Thus, in scenes where differences in the visible reflectivities are present or which can be exaggerated by light sources such as flash bulbs or strobes, it is highly desirable to evaluate the IR radiation because, with such IR radiation, there will be less reflectivity differences between, for example, a subject's facial skin and the surrounding clothing or other objects. This substantially minimizes the degree of under or overexposure in such situations. It is, therefore, apparent that under flash conditions with exaggerated scene differences in reflectivities it is desirable to have the photocell detector respond to IR radiation.

Advantageously, in operation under high ambient light conditions, where the blades reach only small scanning aperture values, the novel system essentially precludes IR photocell reception and hence, IR evaluation. However, with lower ambient conditions, as the scan begins to reach larger aperture values, it reduces and subsequently eliminates IR filtering to provide unfiltered reception at these increased exposure values. Since the flash is fired at later rather than early stages of the scan, flash firing which assumes greater importance under lowered ambient conditions is thus coincident with the unfiltered reception. Consequently, for this lower ambient condition, the initial, primarily ambient portion of the exposure interval is evaluated under essentially only visible light while during the flash portion of the interval the evaluation employs both visible and infrared scene radiation.

Finally, reference is made to the secondary sweep apertures 39, 40 which are arranged to travel in overlying relation to the IR filter 41 during final scanning of the blades 28, 30 to the terminal position as shown in FIGS. 5 and 5A. During this final stage of such scanning, each of the secondary apertures 39, 40 begin to coincide with the corresponding apertures 36, 37 in overlying relationship to the top and bottom, respectively, of the annular filter 41 (not shown). Thus, some of the scene light is filtered before the central apertures pass out of coincidence over the unfiltered portion 68. This corresponds to the primary apertures 32, 34 defining a maximum primary aperture value. While maintaining this maximum primary aperture, the shutter blades 28, 30 continue to move such that the central secondary apertures 38 pass out of coincidence; the scene light permitted to pass through to the photocell detector is filtered by the filter 41. When the central apertures 38 pass out of coincidence, the overlapping apertures 39 permit only scene light that has the IR blocked to be evaluated (see FIGS. 5 and 5A). This blade position occurs only when there is predominantly low ambient light such as during early morning or late evening where the flash effect is negligible, for example, when taking pictures of the Grand Canyon, objects in the scene are too remote to reflect a significant amount of flash intensity. Under such conditions, it is preferred to return to scene evaluation excluding IR radiation. Consequently, the IR absorption filter 41 is preferred for proper exposure. As explained in the aforementioned references, the blades 28 and 30 can continue to move while maintaining the maximum exposure value due to the fact that the primary aperture blades 32 and 34 are elongated with respect to the entrance aperture 14. Hence, the set of secondary sweep apertures 39 progressively coincide in overlying relationship to the top portion of the annular filter 41 as is shown in FIG. 5A while the maximum exposure value remains unchanged. As noted, this portion of an exposure interval only occurs when the ambient scene light is quite low such that it is desirable to reintroduce spectral filtering.

It will be appreciated that this invention envisions use of a photocell lens having the top half portion made so as to block or absorb IR frequencies while the lower half portion is made in a conventional lens fashion which can pass both IR and visible frequencies. The secondary sweep apertures would be, of course formed so as to achieve the desired filtering control mentioned above during shutter blade scan or strobe. In this regard, for example, under high ambient light conditions an initial pair of cooperating sweep apertures would cooperate over the blocking IR filtered lens half; under relatively low ambient light conditions, another pair of sweep apertures could coincide over the non IR-filtered lens half, while the first noted pair of secondary apertures would terminate or close their effective sweep aperture area. Should light conditions dictate that the blades continue to sweep beyond the condition last noted, such as under low or negligible ambient light and wherein the subject is beyond the effective range of the flash, then a third pair of coinciding sweep apertures could pass in overlying relation to the IR filter lens half while the noted second pair of sweep apertures close or terminate their effective sweep aperture area. Thus, it will be understood, of course, that the foregoing arrangement is designed to control the exposure as did the previously described arrangement.

Figure 8:
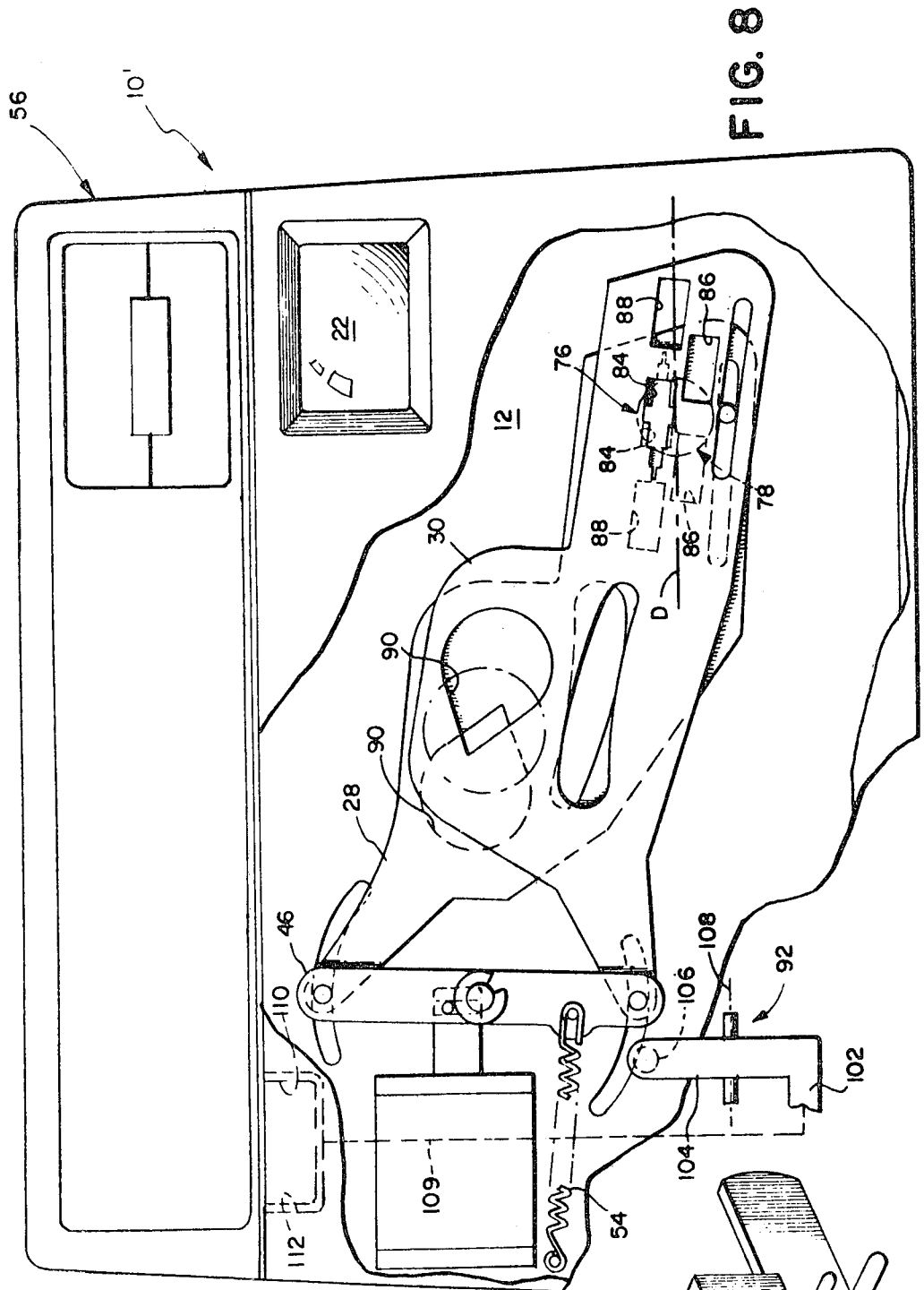
FIG. 8 is a fragmentary diagrammatic front view in elevation depicting a photographic camera incorporating another embodiment of an exposure control system of this invention.
Figure 9:
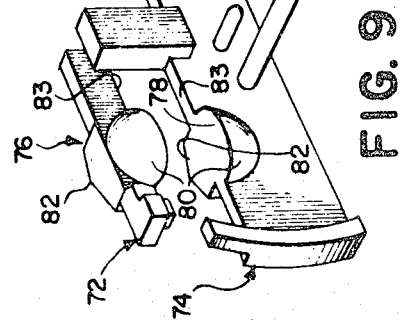
FIG. 9 is an enlarged exploded perspective of the split photocell lens arrangement of the present invention.
Figure 10:
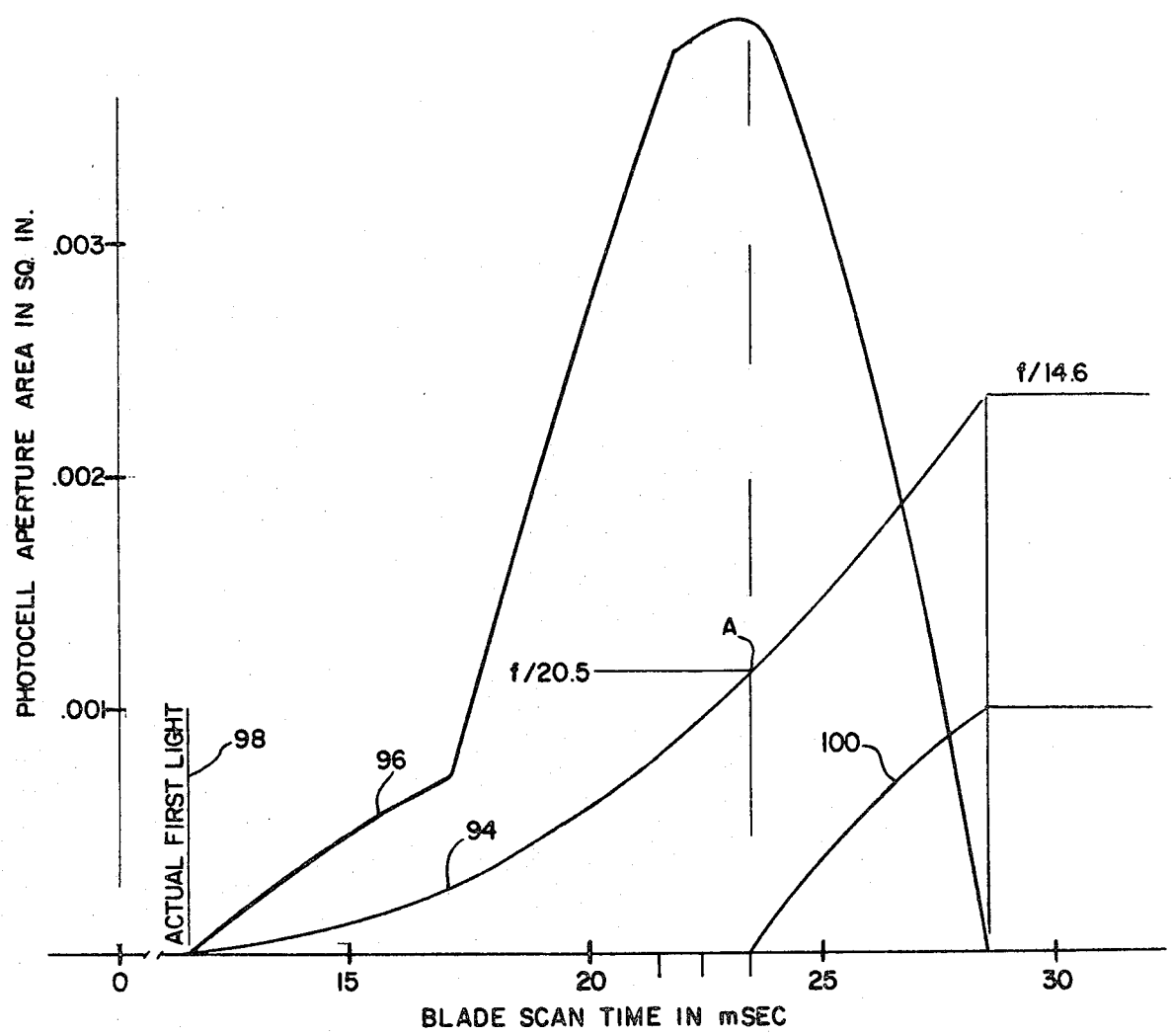
FIG. 10 is a graph illustrating results of the scanning shutter blade apertures during scanning movement.

Reference is made to FIGS. 8-10 for illustrating photographic camera 10' of this invention. As shown, structure like that of the previous embodiment is designated by like reference numerals. The illustrated embodiment as with the previous embodiment preferably includes a photocell lens assembly having upper and lower joinable split lens components 72 and 74; respectively. These split lens components 72, 74 are constructed to be mounted on and supported by the base block casing 12. Longitudinally, intermediate each of the elongate split lens components 72, 74, is an optical lens element 76 and 78; respectively. Essentially, each of the generally symmetrically formed and positioned optical lens elements 76, 78 receive radiation from the scene and introduce such radiation to a photodetector (not shown). Of course, the optical lens elements 76, 78 need not to be symmetrical. Additionally, the optical lens elements 76, 78 are constructed to provide a desired spectral filtering of the scene radiation, in a manner to be discussed presently.

Both the upper and lower optical elements 76, 78 includes front convex surface 80, preferably with a spherical-like shape, and a rear prism-like conformation 82. These prism conformations 82 are constructed to be supported in and received by a suitable window (not shown) formed in the base block casting and to be optically aligned with the photodetector. The prims 82 converge the scene radiation to the photodetector. The optical axis of each convex surface 80 is coincident with the optical axis of its corresponding prism conformation 82. In the assembled condition, the lens components 72 and 74 are joined to each other along relatively smooth mating surfaces 83. As best shown in FIG. 8, the mating surfaces 83 of the optical lens elements 76, 78 meet in a generally horizontal plane D. Significantly, this horizontal mating of the optical lens elements 76 and 78 is parallel to the generally horizontal path of shutter blade travel during reciprocation. Advantageously, this relationship facilitates selectively using the upper and lower optical lens elements 76, 78 during preselected portions of the exposure interval. It should be noted, however, that the direction of blade travel should not be generally transverse to the horizontal plane at which the optical elements 76, 78 are joined together. Otherwise, it would make difficult the construction of the cooperating pairs of photocell sweep apertures 84, 86 and 88 as well as assembly and movement of the shutter blades 28, 30 for achieving the selective spectral filtering in accordance with this invention.

Each of the optical lens elements 76, 78 is, preferably, molded as a single plastic piece from suitable optical materials. In regard to the upper optical lens element 76, it is constructed to provide, in addition to the focusing of the scene radiation to the photodetector, the desired spectral filtering, wherein spectral frequencies in the visible region (e.g. 400–700 nm) are transmitted, while frequencies in the near IR region (e.g. 700–1200 nm) are blocked. On the other hand, the lower optical lens element 78 transmits frequencies in the near infrared region while excluding frequencies in the visible spectrum.

For exposure control purposes, the upper optical lens element 76 is used predominantly in situations involving moderate-to-high ambient light, wherein the primary aperture values are less than maximum. With the scene light being spectrally filtered to block IR, the potential of overexposing blue sky is eliminated. As noted above, a flash can be fired during exposure and the reflected light thereof evaluated in accordance with the invention without the benefit of IR radiation. Since flash contribution under these levels of ambient light is not controlling, the lack of precise flash accuracy is tolerated in favor of ambient control. The lower optical lens element 78 is used predominantly in situations involving firings of the flash strobe unit 56, wherein the ambient light is very low and accordingly the flash contribution is significant as compared to the ambient. Under these situations, the primary effective aperture value is at a maximum and only the infrared spectral frequencies will be evaluated by the photodetector. Hence, the likelihood of disparate reflectivity values of light in the visible region is eliminated and the relatively more uniform reflectivity values of the infrared frequencies are utilized. The significant advantages of employing a combination of spectral filters as mentioned above are more fully described in copending applications entitled "Method and Apparatus For Controlling Exposure By Selective Use of Blocking Filter", filed on Dec. 31, 1979, by Bruce K. Johnson and John B. Millard, Ser. No. 108,547; and "Method and Apparatus For Controlling Exposure By Selective Use of Blocking Visible Filter", filed on Mar. 4, 1980, by John B. Millard, Ser. No. 127,120; and both commonly assigned herewith.

Reference is now made to FIG. 8 for purposes of describing the cooperation of the scanning type shutter blades 28, 30 with the upper and lower optical lens elements 76, 78. Each of the shutter blades 28, 30 is formed with a primary or taking aperture 90 and a group of sweep secondary photocell apertures 84, 86, and 88. The apertures 84, 86, 88 and 90 on one blade are configured to be identical with their corresponding apertures on the other blade. In use, the secondary photocell apertures 84, 86, 88 of the blades progressively coincide to define progressively varying sets of photocell aperture values as a function of blade positioning during exposure. Blade positioning varies as the shutter blades 28, 30, travel from a scene light blocking condition, similar to that shown in FIG. 1, to a maximum scene light unblocking condition; similar to that shown in FIG. 5. In the scene light blocking condition, neither the taking apertures 90 nor any of the pairs of sweep apertures 84, 86 and 88 overlap. During blade displacement, however, the photocell sweep apertures 84 initially overlap. This is shown more clearly in FIG. 8. These sweep apertures 84 are effective to direct the scene radiation through the upper optical element 76. As a result, only the scene radiation having visible spectral frequencies will be directed toward the photodetector for scene light integration purposes since the infrared (IR) frequencies will be blocked. This occurs during high ambient light conditions, wherein infrared frequencies are undesired and further wherein flash contribution will not be as great as during the noted strobe mode.

Continued displacement of the shutter blades 28, 30 results in the second set of sweep photocell apertures 86 overlapping over the lower optical element 78. Although this arrangement of the shutter blades 28, 30 and apertures 86 is not shown, such cooperation is apparent from the description of the previous embodiment. Accordingly, only infrared (IR) frequencies will be directed to the photodetector since the visible light frequencies are blocked. The advantageous results attributed to exclusive use of the infrared frequencies is that infrared reflectivity values do not vary as widely as do visible light reflectivity values, particularly in the strobe mode. As a consequence, the problems of relatively great reflectivity values causing poor photographs during the strobe mode (i.e., effect of the flash contribution upon photodetector is greater than in ambient) is minimized substantially to provide a marked improvement in the quality of the resultant photograph.

The third set of photocell sweep apertures 88 are constructed to overlap during continued shutter blade displacement so as to change the path of scene radiation traveling to the photodetector. In this regard, the photocell sweep apertures 88 overlap to direct the scene radiation to the upper optical lens element 76. Although this particular arrangement is not illustrated, such arrangement is apparent from the previous description. This positioning of the photocell sweep apertures 88 occurs when there is predominantly low ambient light and where the effect of flash is negligible. Such conditions can occur during early morning or late evening with a distant photographic subject; for example, under low light conditions when taking pictures of the Grand Canyon wherein the objects of the scene are too remote to reflect a significant amount of flash intensity. Under such conditions, it is preferred to return to scene evaluation excluding IR radiation. Hence, the upper lens element 76 is used for such purposes.

Since it is preferred to employ the split lens element 76, 78 in this embodiment and the previous one, then this shutter blade arrangement is preferred in the previous embodiment as well as this embodiment.

During a short duration of blade scan time, both the cooperating pairs of photocell sweep apertures 84 and 86 pass scene radiation to the upper and lower optical lens elements 76 and 78. For instance, this dual scene radiation path occurs as the overlapping photocell apertures 84 are closing and while the photocell apertures 86 are opening. Additionally, continued blade scan will result in both the cooperating pairs of photocell sweep apertures 86 and 88 passing, for a short period of time, scene radiation to the upper and lower optical lens elements 76 and 78. This occurs just prior to closing of the overlapping photocell sweep apertures 86 and after opening of the photocell sweep apertures 88. While the foregoing periods of dual scene radiation admittance to the optical lens elements 76 and 78 result in a certain compromise in the desired exclusive use of one element or the other during exposure control, such compromise is acceptable in order to provide uninterrupted integration of scene light by the photodetector. Without such continuity, the photocell detector will be less effective in controlling exposure, thereby resulting in less than desired photographic results.

Specific reference is now made to FIG. 8 taken along with FIG. 10 for purposes of depicting a shutter blade intercept arrangement 92 of the illustrated embodiment. In this embodiment, the flash strobe unit 56 is removable, and as will be explained, removal of the flash strobe 56 effects operation of the shutter blade intercept arrangement 92. Although this illustrated embodiment discloses that the strobe be removed to effect the intercept of the shutter blades; it is within the spirit of this invention that a switchable electrical arrangement be used to effect the desired operation of stop 106 without the necessity of removing the strobe. Basically, the blade intercept arrangement 92 is constructed and operated for intercepting and limiting shutter blade displacement and thereby controlling the effective taking aperture value. In this embodiment, displacement of the shutter blades 28, 30 is stopped when it is desired to improve depth of field in scenes having moderate-to-high ambient light without flash contribution. Accordingly, the shutter blades 28, 30 are limited in a manner so that the effective taking aperture value is small.

In this embodiment, when the flash strobe unit 56 is removed from the camera housing 14, flash firing will not occur and will not, of course, provide contribution to the evaluated scene radiation. Thus, it is desirable to not only employ a small taking aperture as noted above, but also to prevent use of the lens element 78 which blocks visible frequencies. Towards this end, the shutter blades 28, 30 are stopped just prior to the overlapping of the photocell sweep apertures 86.

In connection with the above description of the intercept arrangement 92, reference is made to FIG. 10 for better illustrating the points in time during which the shutter blades 28, 30 are stopped. As shown, the effective taking aperture area is indicated, in part, by curve 94 and the first effective photocell exposure aperture area is indicated, in part, by curve 96. The effective taking aperture area curve 94 is, of course, defined by the overlapping taking apertures 90 while the effective first photocell aperture area curve 96 is defined by the overlapping apertures 84. These areas vary in time from the incidence of first light, indicated at 98, detected by the photodetector. As noted in this embodiment, it is desired to intercept or stop shutter blade movement prior to the photocell sweep apertures 86 becoming effective for defining the effective photocell aperture area defined, in part, by curve 100. In a given camera design, the position of the intercept is a function of various factors. So long as the shutter blades 28, 30 stop to define effective exposure aperture areas at or prior to a point A, corresponding to f/20.5, the lens element 76 is employed, hence visible light is evaluated in the illustrated embodiment.

As noted, for effectuating selective operation of the blade intercept, the present invention uses the selectively operable blade intercept arrangement 92. This blade intercept arrangement 92 is of the kind described in U.S. Pat. No. 4,104,653. Accordingly, reference is made to this patent for a more complete description thereof. Included in the blade intercept arrangement 92 is a control arm 102 having an extension arm member 104 and protruding outwardly therefrom and into the plane of the drawing is a stop member 106. In this embodiment, the extension arm 104 is pivotally connected about an axis 108 so that the stop member 106 may be pivoted into or out of the walking beam travel path depending on whether or not the strobe flash unit 68 is to be fired. The stop member 106 interferes with the walking beam 46, as the latter is biased by the spring 54 towards the scene light admitting condition, for stopping movement of the shutter blades 28 and 30. In this manner, the photocell sweep apertures 86 are prevented from overlapping in light passing relationship. This blade positioning limits, of course, the effective taking aperture area defined by the overlapping taking apertures 90. Thus, a greater depth of field is permitted when taking photographs without flash contribution. The control arm 102 can be adjustably controlled to establish the interfering and non-interfering positions of the stop member 106 relative to the walking beam 46. The control arm 102 may be directly responsive to an operator performed adjustment as, for example, by a switch actuated solenoid controlling the arm. In the present embodiment, a linkage illustrated at 109 which is activated by the insertion of a terminal 110 from the flash unit 56 into a receiving socket 112 is formed in the camera housing. Insertion of the strobe flash unit 56 into the socket 112 controls positioning of the stop member 106 so as to be outside of the path of movement of the walking beam 46. On the other hand, removal of the strobe flash unit 56 effects movement of the stop member 106 into the path of the walking beam 46 for purposes of stopping the walking beam. Thus, the foregoing provides selectively operable means for effecting blade intercept in response to the desirability of wanting to fire a source of artificial illumination or not. It should be understood, of course, that a number of arrangements can be used for purposes of effecting the selective blade intercept operation mentioned above.

The light integrating unit provides an evaluation of scene radiation during an evaluation period which, in the illustrated embodiments, occur essentially simultaneous with at least the initial stages of the exposure interval. Further, since the light integration only continues until a 1.2 volt level is reached, the actual length of the evaluation period is determined by the scene radiation; however, it should be understood that novel arrangements described herein are also applicable to pre-evaluation of scene lighting and to fixed periods of evaluation.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. In a photographic apparatus having means for directing image forming light rays from a scene to a photographic film material mounted at a given focal plane, means for evaluating radiation from said scene during an evaluation period, means for unblocking and blocking passage of said image forming rays to said focal plane, and means responsive to said evaluating means for controlling said unblocking means to define an evaluation period, the improvement wherein said evaluating means includes:

means for evaluating scene radiation along a first path for substantially precluding evaluation of selected spectral frequencies and along a second path substantially permitting evaluation of said selected frequencies and additionally including means for alternating between said paths during said evaluation period.

2. The apparatus of claim 1 wherein said means for alternating between said paths is responsive to operation of said blocking and unblocking means.

3. The apparatus of claim 1 including means for producing a flash of illumination during evaluation of scene radiation along said second path.

4. The apparatus of claim 1 wherein said means for alternating between said paths includes a blade arrangement having an aperture configuration adapted for blocking one of said paths while opening the other path during movement of said blade arrangement.

5. In a photographic camera apparatus including means for mounting photographic film material at a given focal plane, a light exposure opening for allowing passage of light to the film, means for evaluating scene radiation during an evaluation period, a blade mechanism, means for mounting said blade mechanism for displacement between first and second positions, flash means for producing a pulse of illumination directed at the scene for a short portion of the period, said blade mechanism defining primary aperture values enabling a range of changing apertures over said exposure opening when said blade mechanism moves toward said second position and also defining a plurality of discrete secondary aperture values enabling a range of changing aperture values for controlling the amount of scene radiation transmitted to the evaluating means as said blade mechanism moves to the second position, means for displacing said blade mechanism from the first position to the second position and in response to the amount of scene radiation sensed by the evaluating means during the period for returning the blade mechanism to the first position, the improvement comprising:

means in cooperation with said blade mechanism for substantially permitting evaluation of selected spectral frequencies along a first path to the evaluating means during the short portion of the evaluation period while substantially precluding evaluation of said selected frequencies along at least a second path during at least one portion of said period, said means in cooperation with the blade mechanism including means for directing scene radiation along the first path to said evaluating means and having at least one spectral energy filter associated with said directing means to block the evaluation of said selected frequencies along the second path, said filter defining a transmission area which permits evaluation of said selected frequencies along the first path to the evaluating means, said secondary apertures arranged so that during a complete scanning movement of the blade mechanism from the first to the second position, a first set of the plurality of said secondary apertures is arranged to be brought into coincidence relative to the second path and the spectral filter for said one portion of the period for preventing evaluation of said selected frequencies along the second path by the evaluation means, a second set of said secondary apertures is arranged to be brought into coincidence over the transmission area during the short portion to allow evaluation of said selected frequencies along the first path while the first set is moved out of coincidence to thereby block passage of said selected frequencies along the second path, and a third set of said secondary apertures is arranged to be brought into coincidence relative to the second path and the spectral filter for preventing evaluation of said selected frequencies along the second path to the evaluation means, while the second set is moved out of coincidence to thereby again block evaluation of said selected frequencies along the first path.

6. The camera of claim 5 wherein said means has, in cooperation with said blade mechanism, another spectral filter associated with said transmission area, said another filter having a photoresponse different from the photoresponse of said one spectral filter and able to pass the selected frequencies to the evaluating means.

7. In an exposure control system for use in a photographic camera apparatus of the type including means for mounting photographic film material at a given focal plane, a light exposure opening for allowing passage of scene radiation to the film, said system including means for evaluating scene light during an evaluation period, a blade mechanism, means for mounting said blade mechanism for displacement between first and second positions, flash means for producing a pulse of illumination directed at the scene for a short portion of the period, said blade mechanism defining primary aperture values enabling a range of changing apertures over said exposure opening when said blade mechanism moves toward said second position and also defining a plurality of discrete secondary aperture values enabling a range of changing aperture values for controlling the amount of scene radiation transmitted to the evaluating means as said blade mechanism moves to the second position, means for displacing said blade mechanism from the first position to the second position and in response to the amount of scene radiation sensed by the evaluating means during the period for returning the blade mechanism to the first position, the improvement comprising:

means in cooperation with said blade mechanism for substantially permitting evaluation of selected frequencies along a first path to the evaluating means during the short portion of the evaluation period while substantially precluding evaluation of said selected frequencies along at least a second path during at least one portion of said period, said means in cooperation with the blade mechanism including means for directing scene light radiation along the first path to the evaluating means and having one spectral energy filter associated with said directing means to block the evaluation of said selected frequencies along the second path, said filter defining a transmission area which permits evaluation of said selected frequencies along the first path to the evaluating means, said secondary apertures arranged so that during a complete scanning movement of the blade mechanism from the first to the second position, a first set of the plurality of said secondary apertures is arranged to be brought into coincidence relative to the second path and the spectral filter for said one portion of the period so as to prevent evaluation of said selected frequencies along the second path by the evaluating means, a second set of said secondary apertures is arranged to be brought into coincidence over the transmission area during the short portion to allow evaluation of said selected frequencies along the first path while the first set is moved out of coincidence to thereby block passage of said selected frequencies along the second path, and a third set of said secondary apertures is arranged to be brought into coincidence relative to the second path and the spectral filter for preventing evaluation of said selected frequencies along the second path to the evaluation means, while the second set is moved out of coincidence to thereby again block evaluation of said selected frequencies along the first path.

8. The system of claim 7 wherein said means in cooperation with said blade mechanism has another spectral filter associated with said transmission area, said another filter having a photoresponse different from the photoresponse of said one spectral filter and able to pass the selected frequencies to the evaluating means.

9. A photographic camera apparatus including means for mounting photographic film at a given focal plane, a light exposure opening for allowing passage of scene radiation to the film, means for sensing light from the scene to be photographed including means for providing an output response varying proportionately to the scene light incident thereon, and means spaced from the output response means for directing scene light to the output means, a blade mechanism positioned intermediate the directing means and output means, means for mounting the blade mechanism for displacement between first and second positions to facilitate an exposure interval, flash means responsive to said sensing means during the exposure interval for firing a flash at distinct short intervals over a range of times within the exposure interval corresponding to a select proportion of a determined exposure value of the sensing means for a short portion of the exposure interval, the blade mechanism defining primary apertures over the exposure opening when the blade mechanism moves from the first position toward the second position and also defining a plurality of discrete sweep secondary apertures enabling a range of corresponding changing sweep aperture values for controlling the amount of scene light sensed by the output means as the blade mechanism moves toward the second position, and means for displacing the blade mechanism from the first position toward the second position and in response to the amount of scene light sensed by the output means for returning the blade mechanism to the first position, the improvement wherein:

said directing means including a first spectrally filtered portion and a second spectrally filtered portion spaced from the blade machanism for respectively directing spectrally filtered scene light to the sensing means, said first filtered portion substantially blocking preselected frequencies of the scene light, said second filtered portion substantially permitting transmission of the scene light including said preselected frequencies, and said plurality of discrete sweep apertures formed to substantially unblock passage of scene light passing through the first filtered portion to the sensing means while substantially simultaneously enabling blocking of light passing through the second filtered portion to the sensing means at a first time other than the short interval, as the blade mechanism moves toward the second position, said sweep apertures being formed for substantially blocking of light through the first filtered portion to the sensing means while substantially unblocking the passing of scene light through the second filtered portion to the sensing means during a portion at the short time the flash is fired, said sweep apertures being formed to pass scene light through the first spectral filter while enabling blocking scene light from passing through the second spectral filter during a second time other than the short interval.

10. In an exposure control system for use in a photographic camera apparatus of the type including means for mounting photographic film at a given focal plane, a light exposure opening for allowing passage of scene radiation to the film, said system including means for sensing radiation from the scene to be photographed including means for providing an output response varying proportionately to the scene radiation incident thereon, and means spaced from the output response means for directing scene radiation to the output means, a blade mechanism positioned intermediate the directing means and output means, means for mounting the blade mechanism for displacement between first and second positions to facilitate an exposure interval, flash means responsive to said sensing means during the exposure interval for firing a flash at distinct short intervals over a range of times within the exposure interval corresponding to a select proportion of a determined exposure value of the sensing means for a short portion of the exposure interval, the blade mechanism precludes scene radiation from reaching the focal plane when in the first position, the blade mechanism defining primary apertures over the exposure opening when the blade mechanism moves from the first position toward the second position and also defining a plurality of discrete sweep secondary apertures enabling a range of corresponding changing sweep aperture values for controlling the amount of scene radiation sensed by the output means as the blade mechanism moves toward the second position, and means for displacing the blade mechanism from the first position toward the second position and in response to the amount of scene radiation sensed by the output means for returning the blade mechanism to the first position, the improvement comprising:

said directing means including a first spectrally filtered portion and a second spectrally filtered portion spaced from the blade mechanism for respectively directing spectrally filtered scene radiation to the sensing means, said first filtered portion subsequently blocking preselected frequencies of the scene radiation, said second filtered portion substantially permitting transmission of the scene radiation including said preselected frequencies, and said plurality of discrete sweep apertures formed to substantially unblock passage of scene radiation passing through the first filtered portion to the sensing means while substantially simultaneously enabling blocking of scene radiation passing through the second filtered portion to the sensing means at a first time other than the range of times in the short interval as the blade mechanism moves toward the second position, said sweep apertures being formed to substantially enable the blocking of scene radiation through the first filtered portion to the sensing means while substantially unblocking the passing of scene radiation through the second filtered portion to the sensing means during a portion at the short time the flash is fired; said sweep apertures being formed to pass scene radiation through the first spectral filter while enabling blocking scene radiation from passing through the second spectral filter during a second time other than the short interval.

11. In photographic camera apparatus including means for mounting photographic film at a given focal plane, a light exposure opening for allowing passage of light to the film, means for evaluating light from the scene to be photographed including during an exposure period, means spaced from the evaluating means for directing scene radiation thereto, means for unblocking and blocking passage of the image forming rays to the focal plane and being displaceable between first and second positions along a given path to facilitate formation of an exposure interval, said unblocking means having primary apertures for defining primary aperture values over the exposure opening when moving from the first position toward the second position and also defining a plurality of sweep apertures for defining a range of corresponding changing sweep aperture values for controlling the amount of scene radiation evaluated by the evaluation means as the unblocking means moves toward the second position, and means for displacing the unblocking means from the first position toward the second position in response to the amount of scene radiation sensed by the evaluating means for returning the unblocking means to the first position, the improvement wherein:

said directing means including first and second spectrally filtered portions, each of which direct spectrally filtered scene radiation frequencies to the evaluating means; said first filtered portion substantially blocking preselected infrared frequencies of the scene radiation while transmitting preselected visible frequencies of the scene radiation; said second filtered portion substantially permitting transmission of said infrared frequencies of the scene radiation while substantially blocking said visible frequencies of the scene radiation; and said first and second filtered portions being joined together so that portions of mutually abutting segment surfaces thereof generally extend in a direction generally parallel to said given path of the unblocking means between said first and second positions.

12. In photographic camera apparatus including means for mounting photographic film at a given focal plane, a light exposure opening for allowing passage of light to the film, means for sensing light from the scene to be photographed including means for providing an output response in accordance with the time integration of scene radiation intensity incident thereon, and means spaced from the output response means for directing scene radiation to the output means, means for unblocking and blocking passage of the image forming rays to the focal plane and being displaceable between first and second positions along a given path to facilitate formation of an exposure interval, said unblocking means for defining primary apertures over the exposure opening when moving from the first position toward the second position and for also defining a plurality of sweep apertures enabling a range of corresponding changing sweep aperture values for controlling the amount of scene light sensed by the output means as the unblocking means moves toward the second position, and means for displacing the unblocking means from the first position toward the second position in response to the amount of scene radiation sensed by the output means for returning the unblocking means to the first position, the improvement wherein:

said directing means including first and second spectrally filtered portions, each of which directs spectrally filtered scene radiation frequencies to the sensing means; said first filtered portion substantially blocking preselected infrared frequencies of the scene radiation while transmitting preselected visible frequencies of the scene radiation; said second filtered portion substantially permitting transmisson of said infrared frequencies of the scene radiation while substantially blocking said visible frequencies of the scene radiation; said sweep apertures formed to substantially permit passage of said infrared frequencies to the sensing means from said first filtered portion while substantially preventing passage of said visible frequencies to the sensing means from said second filtered portion during an initial portion of said exposure interval as the unblocking means moves toward said second position; said sweep apertures being formed to substantially prevent passage of said visible frequencies to the sensing means from the first filtered portion while substantially permitting passage of said infrared frequencies to the sensing means from the second filtered portion during a flash portion of said exposure interval following said first interval portion as the unblocking means moves towards said second position; said sweep apertures being formed to substantially permit passage of said visible frequencies to the sensing means from said first filtered portion while substantially preventing passage of said infrared frequencies to the sensing means from said second filtered portion during another portion of said exposure interval following said second interval portion as the unblocking means moves towards said second position; said first and second filtered portions being joined together so that portions of mutually abutting surfaces thereof generally extend in a direction generally parallel to said given path of the unblocking means between said first and second positions.

13. In photographic camera apparatus including means for mounting photographic film at a given focal plane, a light exposure opening for allowing passage of light to the film, means for evaluating light from the scene to be photographed including during an exposure period, means spaced from the evaluating means for directing scene radiation thereto, means for unblocking and blocking passage of the image forming rays to the focal plane and being displaceable between first and second positions along a given path to facilitate formation of an exposure interval, said unblocking means having primary apertures for defining primary aperture values over the exposure opening when moving from the first position toward the second position and also defining a plurality of sweep apertures for defining a range of corresponding changing sweep aperture values for controlling the amount of scene radiation evaluated by the evaluation means as the unblocking means moves toward the second position, and means for displacing the unblocking means from the first position toward the second position in response to the amount of scene radiation sensed by the evaluating means for returning the unblocking means to the first position, flash means connectable to said camera apparatus and being actuatable for firing a flash of illumination during a portion of the exposure interval, the improvement wherein:

said directing means including first and second spectrally filtered portions, each of which direct spectrally filtered scene radiation frequencies to the evaluating means; said first filtered portion substantially blocking preselected infrared frequencies of the scene radiation while transmitting preselected visible frequencies of the scene radiation; said second filtered portion substantially permitting transmission of said infrared frequencies of the scene radiation while substantially blocking said visible frequencies of the scene radiation; said sweep apertures formed to substantially permit passage of said infrared frequencies to the sensing means from said second filtered portion while substantially preventing passage of said visible frequencies to the sensing means from said second filtered portion during an initial portion of said exposure interval as the unblocking means moves toward said second position; said sweep apertures being formed to substantially prevent passage of said visible frequencies to the sensing means from the first filtered portion while substantially permitting passage of said infrared frequencies to the sensing means from the second filtered portion during a second portion of said exposure interval following said first interval portion as the unblocking means moves towards said second position; said first and second filtered portions being joined together so that portions of mutually abutting segment surfaces thereof generally extend in a direction generally parallel to said given path of the unblocking means between said first and second positions; and said flash means including operable means cooperating with said unblocking means to prevent said unblocking means from reaching the second position to thereby limit the primary aperture values to a preselected value and to prevent the sweep apertures from entering said second portion of said exposure interval and said cooperating means operative for permitting said second position when it is not intended to actuate said flash means for firing.

14. A method of exposing photographic film comprising the steps of:
    initiating a scene light evaluation period by directing image forming scene light rays from a scene to be photographed to photographic film material located at a given focal plane;
    evaluating selected spectral frequencies of the scene illumination along a first path by essentially excluding predetermined frequencies at least during a portion of the evaluation period;
    evaluating selected spectral frequencies of the scene illumination along at least a second path by including the predetermined frequencies during another portion of the evaluation period; and
    blocking passage of image forming light rays from the scene to the film in response to a predetermined value of evaluated scene radiation to thereby terminate the evaluation period.

15. The method of exposing photographic material by an exposure control system for use in a photographic camera having means for directing image forming rays from a scene along a given path to the photographic film material mounted in the focal plane of the camera, the system including means for sensing scene radiation during an exposure interval, a blade mechanism which precludes scene light from reaching the focal plane when in a first position, said blade mechanism defining primary aperture values enabling a range of changing apertures over said exposure opening when said blade mechanism moves toward a second position and also defining a plurality of discrete secondary aperture values enabling a range of changing aperture values for controlling the amount of scene light transmitted to said sensing as said blade mechanism moves to the second position, means responsive to said sensing means for controlling the blade mechanism to define the exposure interval selected in accordance with an accumulated total of scene radiation sensed by said sensing means, means for producing a short pulse of illumination directed at the scene for a short portion of the exposure interval, a photocell lens which directs scene light radiation onto the sensing means, at least one spectral energy filter associated with said lens to block the selected frequencies through a portion of the photocell lens and another portion defined by the lens which permits passage of the selected frequencies to the sensing means, the improvement comprising the steps of:
    passing the sweep apertures in scene light transmitting coincidence relative to the spectral filter during movement of the blade mechanism to the second position so as to permit passage of the spectrally filtered scene radiation to the sensing means;
    subsequently passing sweep apertures in light transmitting coincidence relative to the other portion defined by the lens to permit passage of scene radiation including the previously spectrally filtered scene radiation during the short portion of the interval; and
    subsequently passing sweep apertures in light transmitting coincidence relative to the spectral filter to again permit passage of the spectrally filtered scene radiation to the sensing means.

16. The method of claim 15 further comprising the step of selectively obstructing the blade mechanism displacement so that the sweep apertures are prevented from being in relative coincidence to the other portion for transmitting radiation when the illuminating means is not going to be pulsed and for permitting unobstructed movement of the blade mechanism when the flash is to be fired.

17. The method of claim 15 further comprising the step of: joining the spectral filter and the other portion along a given extent which is generally parallel to a path traveled by the passing sweep apertures.

18. In a photographic apparatus having means for directing image forming light rays from a scene along a given path to a photographic film material mounted at a given focal plane, means for evaluating radiation from said scene during an evaluation period, means for unblocking and blocking said path, and means responsive to said evaluation means for controlling said unblocking means to define an exposure interval, the improvement wherein said evaluating means includes:
    means responsive to operation of said unblocking and blocking means for automatically substantially precluding evaluation of selected spectral frequencies during at least one portion of the operation of said unblocking and blocking means while substantially permitting evaluation of said selected frequencies during at least another portion of the operation of said unblocking and blocking means.

19. The camera of claim 18 including means for producing a flash of illumination during said other portion of said period.

20. In a photographic camera apparatus including means for mounting photographic film material at a given focal plane; a light exposure opening for allowing passage of light to the film; detecting means for evaluating scene light; a blade mechanism mounted for displacement between a first and second position; said blade mechanism precluding passage of scene light through said exposure opening when in said first position and defining changing primary aperture values over said exposure opening and changing secondary aperture values over said detecting means as said blade mechanism moves toward said second position; and drive means actuatable for initially displacing said blade mechanism from said first position toward said second position and, in response to the amount of scene light detected by said detecting means, for returning said blade mechanism to said first position, the improvement comprising:

filtering means responsive to displacement of said blade mechanism for automatically precluding transmission of light of selected frequencies to said detecting means during at least one portion of said displacement of said blade mechanism toward said second position and for transmitting said selected frequencies to said detecting means during another portion of said displacement.

21. In an exposure control system for photographic apparatus of the type including means for positioning photographic film material at a given focal plane, a light exposure opening allowing passage of scene light to the film; said system including scene light detecting means for detecting scene light transmitted to said focal plane; a blade mechanism including a shutter blade having a spaced apart primary and secondary aperture, said primary aperture arranged to enable changing aperture sizes over said exposure opening and said secondary aperture arranged to enable a range of changing aperture sizes over said light detecting means during movement of said blade from a first to a second position; means for mounting said blade element for displacement between said first and second positions; and selectively actuatable drive means for displacing said blade between said first and second positions, the improvement wherein said detecting means comprises:

means responsive to operation of said unblocking means including filtering means responsive to displacement of said blade mechanism for automatically precluding transmission of light of selected frequencies to said detecting means during at least one portion of said displacement of said blade mechanism toward said second position and for transmitting said selected frequencies to said detecting means during another portion of said displacement.

* * * * *